United States Patent
Murasawa

(10) Patent No.: US 6,207,004 B1
(45) Date of Patent: Mar. 27, 2001

(54) METHOD FOR PRODUCING THIN IC CARDS AND CONSTRUCTION THEREOF

(75) Inventor: Yasuhiro Murasawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/202,562
(22) PCT Filed: Jun. 17, 1996
(86) PCT No.: PCT/JP96/01654
   § 371 Date: Dec. 17, 1998
   § 102(e) Date: Dec. 17, 1998
(87) PCT Pub. No.: WO97/48562
   PCT Pub. Date: Dec. 24, 1997
(51) Int. Cl.[7] .............................. B32B 31/20; H05K 1/14
(52) U.S. Cl. .................... 156/300; 156/302; 156/303.1; 156/306.6; 361/737
(58) Field of Search ........................... 361/737; 156/228, 156/303.1, 297, 299, 300, 306.6, 293, 301, 302

(56) References Cited

U.S. PATENT DOCUMENTS 4,450,024 * 5/1984 Haghiri-Tehrani et al. ......... 156/108
5,952,713 * 9/1999 Takahira et al. ..................... 257/679

FOREIGN PATENT DOCUMENTS

| 20488574 | 6/1992 | (EP) . |
| 60-65552 | 4/1985 | (JP) . |
| 60-76146 | 4/1985 | (JP) . |
| 60-142489 | 7/1985 | (JP) . |
| 2-212196 | 8/1990 | (JP) . |
| 4-286697 | 10/1992 | (JP) . |

* cited by examiner

Primary Examiner—Michael W. Ball
Assistant Examiner—John T. Haran

(57) ABSTRACT

A method for mass producing thin IC cards having beautiful surfaces using a non-polluting polyethylene telephthalate material in which a hot-melt type adhesive is applied and formed on a joint surface of a cover sheet formed from polyethylene telephthalate, and in which a hot-melt adhesive is used as a sealing adhesive at an opening of a core sheet that is held by the cover sheets. To improve the heat-resisting bonding strength of this hot-melt adhesive, a thermosetting resin may be mixed with the hot-melt adhesive.

9 Claims, 5 Drawing Sheets

METHOD FOR PRODUCING THIN IC CARDS AND CONSTRUCTION THEREOF

TECHNICAL FIELD

This application is the national phase under 35 U.S.C. §371 of prior PCT International Application No. PCT/JP96/01654 which has an International filing date of Jun. 17, 1996 which designated the United States of America.

The present invention relates to a method for producing a thin IC card and a construction thereof.

BACKGROUND ART

Thin IC cards have been produced in such a procedure as follows. Electronic components are mounted, by using solder or the like, on lands of a wiring pattern formed on a first cover sheet which is made of vinyl chloride having good self-fusing characteristic. A core sheet made of vinyl chloride, having apertures at positions corresponding to the electronic components mounting positions, is placed over the electronic components. Space around the electronic components in the apertures is filled up with a sealing resin made of a thermosetting resin such as epoxy resin which is cured after filling. Then after placing a second cover sheet made of vinyl chloride on the sealing resin, the assembly of sheets is heated at about 120° C. for 5 to 10 minutes while applying a pressure of 5 kgf/cm$^2$ by means of a press, thereby completing the thin IC card.

The sealing resin is preferably applied so that the surface is at the same height as the core sheet surface, but the resin changes the volume thereof when curing, and therefore it is difficult to accurately control the amount of the resin to fill. Further, while portions other than the filling resin join with each other through thermal fusion of vinyl chloride, top surfaces of the filling resin are exposed through the cover sheet, resulting in a problem that clear image cannot be printed when printing a pattern on the cover sheet surface.

Thus, it is a first object of the present invention to provide a method for producing a thin IC card with beautiful finish of the cover sheet surface at positions corresponding to the apertures of the core sheet.

Vinyl chloride is capable of self-fusing at a low temperature and is suitable for mass production in a continuous production line. However, vinyl chloride emits a chloride gas when burned, thus polluting the environment. Recently, therefore, it has been proposed to switch the material from vinyl chloride to polyethylene terephthalate (PET). However, polyethylene terephthalate has a melting point above 250° C. and is not self-fusing at a low temperature unlike vinyl chloride. Also in case a thermosetting resin is used as a filling resin of IC cards produced in the continuous production line, such a method cannot be employed as the apertures of the core sheet are filled with the thermosetting resin followed by a period of waiting for the thermosetting resin to cure during the production step. Instead, it is necessary to apply the thermosetting resin on the electronic components in advance. But this method has a problem of causing more impairment of the surface construction of the cover sheet than in the case of the former method.

Thus, it is a second object of the present invention to provide a method for mass producing a thin IC card by using PET which does not have adverse effect on the environment, in a similar way as that for vinyl chloride, while producing the thin IC card of beautiful surface finish.

DISCLOSURE OF THE INVENTION

The present inventors have, through intensive studies, have found that a hot-melt adhesive can be used for filling the apertures instead of the sealing resin without impeding the progress of the step in the continuous production line. The inventor have also found that the thin IC card can be mass-produced with the conventional method of pressurizing while heating at a low temperature, when the hot-melt adhesive of similar nature as that of the cover sheet is applied onto the cover sheet, and that excess or shortage of the filling resin in the apertures can be fine-adjusted thereby producing the thin IC card of beautiful surface, thus completing the present invention.

The present invention provides a method for producing an IC card made by laminating at least a first cover sheet, a core sheet having apertures for housing electronic components and a circuit pattern sheet whereon a wiring pattern is formed and electronic components are mounted, comprising the steps of:

laminating the core sheet on the circuit pattern sheet so that the electronic components mounted on the circuit pattern sheet are located at the positions of the apertures;

filling the apertures housing the electronic components with the hot-melt adhesive;

laminating the first cover sheet on the laminate of the circuit pattern sheet and the core sheet on the opposite side of the circuit pattern sheet, and bonding the sheets via a hot-melt adhesive layer formed on at least one of the opposing bonding surfaces while heating and pressurizing; and cutting the laminate to a predetermined size.

According to the present invention, because the hot-melt adhesive is used as the filling material, it is made possible to bond the layers while excess or shortage in the amount of hot-melt adhesive filling the apertures and the hot-melt adhesive applied to the layers is compensated for when the laminated layers of the IC card are bonded by heating under a pressure, thereby eliminating the problems encountered when a thermosetting resin is used as the filling material, and it is made possible to mass produce the IC card in a continuous production line without waiting for the thermosetting resin to cure.

While the circuit pattern sheet may be made by forming the wiring pattern with the electronic components mounted thereon directly on the cover sheet (as in a first embodiment shown in FIG. 1), the second cover sheet may also be bonded separately from the circuit pattern sheet on the back side thereof (as in a second embodiment shown in FIG. 2).

Although the sheets which have been cut to the finish size may be bonded with each other, it is preferable for the purpose of mass production to supply the sheet materials from rolls of long sheets and repeat the steps described above thereby to continuously produce the thin IC cards (as in the second embodiment shown in FIG. 2).

The sheets are preferably made of polyethylene terephthalate (PET) when disposal by incineration is taken into consideration. However, since PET sheets do not fuse with each other under pressure and low-temperature heating unlike vinyl chloride, it is desirable to apply a hot-melt adhesive on at least one of the bonding surfaces before bonding.

Since the hot-melt adhesive is inferior in heat resistance, it is desired that a thermosetting resin is mixed with the hot-melt adhesive so that the mixture cures when heated, thereby ensuring enough bonding strength at a high temperature. The thermosetting resin to be mixed is selected by taking the cover sheet material and the kind of hot-melt adhesive, which makes the matrix, into consideration. Proportion of the thermosetting resin to be added is preferably within 50% in volume.

While it is preferable that the hot-melt adhesive be applied to the bonding surfaces of the first and the second cover sheets in advance, it may also be applied in step.

The hot-melt adhesive may be applied as a circuit protection layer to the circuit pattern forming surface of the circuit pattern sheet.

According to the present invention, the IC card may also be produced by the following method. Namely, a method for producing an IC card made by laminating at least the first cover sheet, the core sheet having apertures for housing electronic components and the circuit pattern sheet whereon the wiring pattern is formed and the electronic components are mounted, comprises the steps of:

laminating the core sheet on the circuit pattern sheet so that the electronic components mounted on the circuit pattern sheet are located at the positions of the apertures by using the circuit pattern sheet with the hot-melt adhesive layer formed over the entire surface or a part thereof to cover the electronic components mounted thereon;

laminating the first cover sheet on the surface of the laminate of the circuit pattern sheet and the core sheet and bonding the sheets via a hot-melt adhesive layer formed on at least one of the opposing bonding surfaces while heating and pressurizing; and cutting the laminate to a predetermined size.

According to the present invention, the IC card may also be produced by the following method. Namely, a method for producing an IC card made by laminating at least the first cover sheet, the core sheet having apertures for housing electronic components and the circuit pattern sheet whereon the wiring pattern is formed and the electronic components are mounted, comprises the steps of:

applying the hot-melt adhesive on the circuit pattern thereby to cover at least the electronic components mounted thereon;

applying the hot-melt adhesive to at least one of the bonding surfaces of the first cover sheet, the core sheet and the circuit pattern sheet;

laminating the core sheet on the circuit pattern sheet so that the electronic components mounted on the circuit pattern sheet are located at the positions of the apertures;

laminating the first cover sheet on the surface of the laminate of the circuit pattern sheet and the core sheet, and bonding the sheets with each other via a hot-melt adhesive layer formed on the bonding surface thereof while heating and pressurizing; and cutting the laminate to a predetermined size.

According to this method of the first embodiment, it is made possible to produce the IC card comprising the first cover sheet with the wiring pattern formed thereon, the core sheet fastened on the first cover sheet, the electronic components mounted on the lands of the wiring pattern located in the apertures provided in the core sheet, and the second cover sheet fastened onto the core sheet, wherein the space in the apertures of the core sheet around the electronic components is filled with the hot-melt adhesive which may include a thermosetting resin, while the first and the second cover sheets are bonded via the hot-melt adhesive layer including the thermosetting resin formed on the bonding surfaces of the front and back sides of the core sheet.

The second embodiment provides an IC card comprising the first cover sheet, the core sheet having the apertures for housing the electronic components, the circuit pattern sheet with the wiring pattern formed and the electronic components mounted thereon and the second cover sheet laminated on each other, wherein the space in the apertures of the core sheet around the electronic components is filled with the hot-melt adhesive which may include the thermosetting resin, while the first and the second cover sheets are bonded via the hot-melt adhesive layer which may include the thermosetting resin formed on the bonding surfaces of the front and back sides of the core sheet.

In the embodiment described above, the apertures of the core sheet are preferably tapered to gradually expand near the upper end of the apertures. By forming the apertures in such a construction, it is made possible for a molten second adhesive to easily flow through the tapered portions into the apertures in the heating and the pressurizing step and easily compensating for shortage of the filling material, when the amount of filling material is not sufficient, thereby making the surface of the cover sheet flat.

According to the present invention, the cover sheets which form the front and back surfaces of the IC card are made of polyethylene terephthalate and have hot-melt adhesive layer that may include the thermosetting resin within 50% in volume being on the bonding surface thereof are provided, thus making it possible to mass produce the thin IC card in the continuous production line by employing the method described above.

Also according to the present invention, the hot-melt adhesive including the thermosetting resin powder within 50% in volume is provided as an adhesive for bonding the cover sheets made of polyethylene terephthalate constituting the IC card, thus making it possible to produce the thin IC card having beautiful surface in the continuous production line by using polyethylene terephthalate.

BEST MODE FOR CARRYING OUT THE INVENTION

Figure 1:
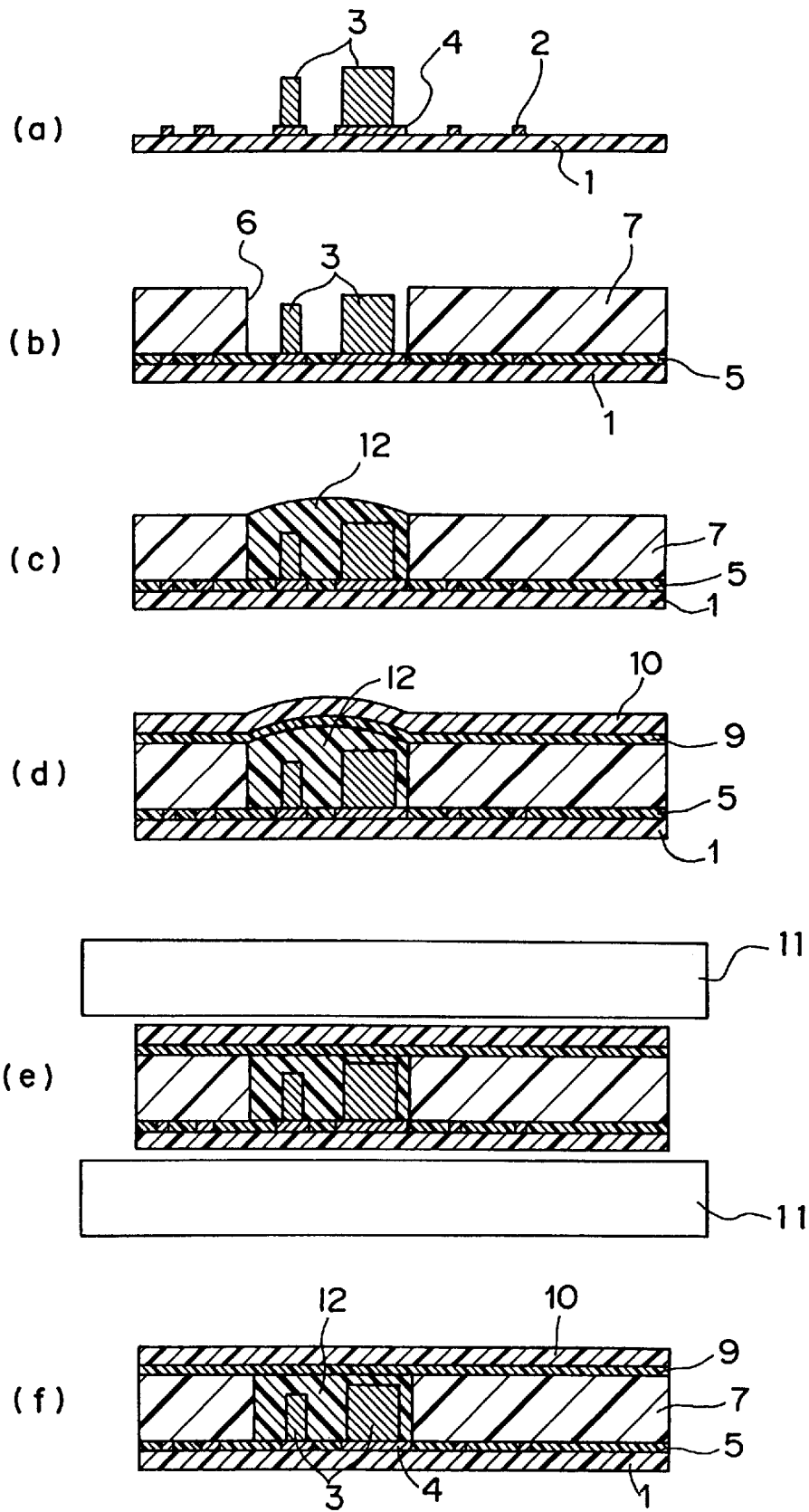
FIG. 1 shows production steps of the thin IC card according to the first embodiment of the present invention.

FIG. 1 shows a production step of the thin IC card according to the first embodiment of the present invention.

As shown in the steps (a), (b), after mounting electronic components 3 by means of solder or the like on lands 4 provided on a first cover sheet 1 which has a wiring pattern 2 formed thereon, a core sheet 7 having an aperture 6 at the mounting position of the electronic components 3 is placed on the first cover sheet 1. As the materials for making the first and the second cover sheets 1, 10 and the core sheet 7, polyethylene terephthalate (PET), for example, is used.

Figure 2:
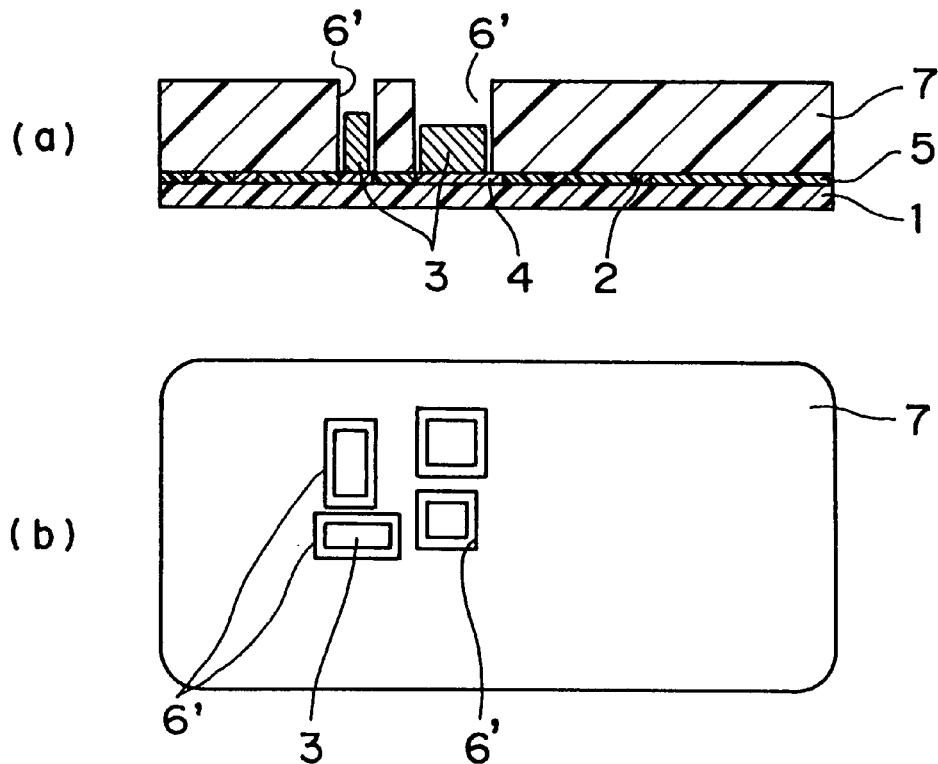
FIG. 2 shows a cross sectional view and a top view of the thin IC card according to a first variation of the first embodiment of the present invention.

Although the aperture 6 of the core sheet 7 in FIG. 1 is made in such a construction as one aperture 6 is provided for a plurality of electronic components 3, one aperture 6' may be provided for each of the electronic components as shown in FIGS. 2 (*a*), (*b*). FIG. 2 (*a*) shows a cross section of a case where the core sheet 7 is provided on the cover sheet 1, and FIG. 2 (*b*) is a top view thereof.

Since the core sheet 7 has such a construction as shown in FIG. 2 and the area of the aperture 6' is smaller than that of FIG. 1, the core sheet 7 surrounding the aperture 6' supports the second cover sheet 10 provided on the core sheet 7 even when the filling material in the aperture is not sufficient, and therefore sinking of the cover sheet 10 on the aperture 6' resulting in a concave surface can be prevented, thus making it possible to keep the surface of the cover sheet 10 flat.

Then as shown in the step (c), the aperture 6 is filled with a sealing adhesive 12 which is a hot-melt adhesive. FIG. 1 (*c*) shows a case where the aperture is filled excessively.

Then as shown in the step (d), after applying the adhesive 9 which has the same or similar nature as the hot-melt adhesive on the core sheet 7 and the sealing adhesive 12, the second cover sheet 10 is laminated thereon.

For the second adhesive, it is preferable to use the hot-melt adhesive of sheet construction as it makes the handling easier.

For the filling adhesive 12 and the adhesive 9, it is preferable to use the hot-melt adhesive which includes a thermosetting resin (for example, hot-melt adhesive including epoxy thermosetting resin within 50% in volume, with the proportion of the additive determined according to the required heat-resistant bonding strength). As the adhesive includes the thermosetting resin, even when the IC card is used under a high temperature (for example, 100° C.) and the hot-melt adhesive melts again, the thermosetting resin included therein does not melt thereby maintaining the bonding function, thus it is made possible to prevent the cover sheet from peeling off.

Last, as shown in the step (e), the first and the second adhesives 5, 9 and the sealing adhesive 12 are heated to about 120° C. while applying a pressure of 5 kgf/cm$^2$, for example, between o the first and the second cover sheets 1, 10 by means of a press 11 or the like while holding the temperature for 5 to 10 minutes to melt the hot-melt adhesive and make the surface of the cover sheet 10 flat, then pressurization and heating are completed to cure the adhesive, thereby completing the thin IC card as shown in the step (f).

In this embodiment, because the hot-melt adhesive of the same material as that of the adhesive 9 is used for the sealing adhesive 12, excess of the sealing adhesive 12 is melted and pressurized in the step (e) and spreads over the core sheet 7 thereby to serve as the second adhesive, and therefore it is made possible to finely adjust the amount of the sealing adhesive 12 which fills the aperture and achieve a very flat surface of the second cover sheet 10.

When the amount of the sealing adhesive 12 is insufficient, on the contrary, part of the second adhesive 9 located on the core sheet 7 moves into the aperture and serves as the sealing adhesive in the step (e), thus making it possible to finely adjust the amount of the sealing adhesive 12 which fills the aperture and achieve a very flat surface of the second cover sheet 10.

Moreover, because the hot-melt adhesive of the same material is used for the sealing adhesive 12 and the adhesive 9, both adhesives cure at the same time and the production step can be simplified as compared to the conventional method.

For the sealing adhesive 12, it is preferable that a hot-melt adhesive 12' of the same material or having the same nature as the adhesive 9 be used in fluid condition. Use of the adhesive 12' in liquid state makes it possible to prevent bubbles from forming during filling of the aperture 6 and, as the electronic components 3 are not subject to impact during filling, it is also made possible to prevent connections of the electronic components 3 from breaking.

Figure 3:
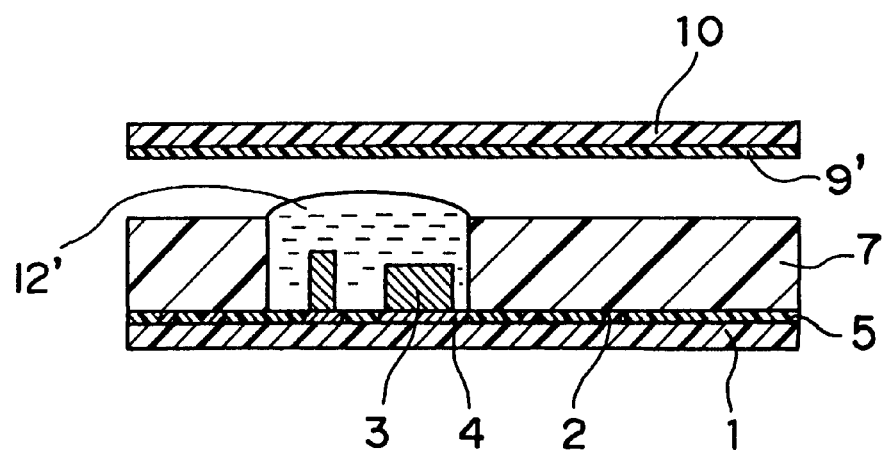
FIG. 3 is a cross sectional view of the thin IC card according to a second variation of the first embodiment of the present invention.

It is most preferable to use the hot-melt adhesive 12' in liquid state for the sealing adhesive and use the hot-melt adhesive 9' of sheet construction for the second adhesive as shown in FIG. 3, for the ease of handling.

Figure 4:
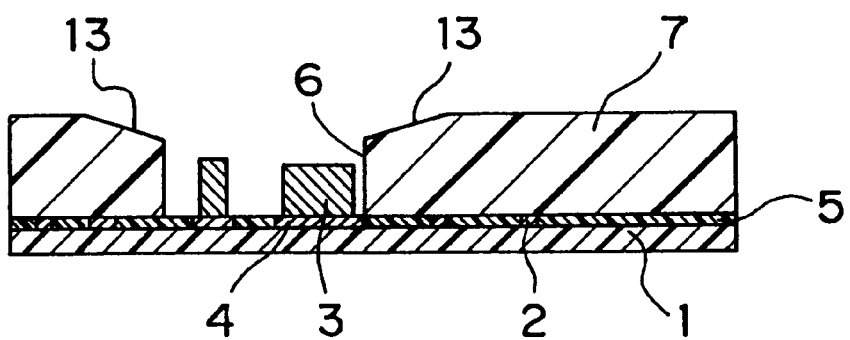
FIG. 4 is a cross sectional view of the thin IC card according to a third variation of the first embodiment of the present invention.
Figure 5:
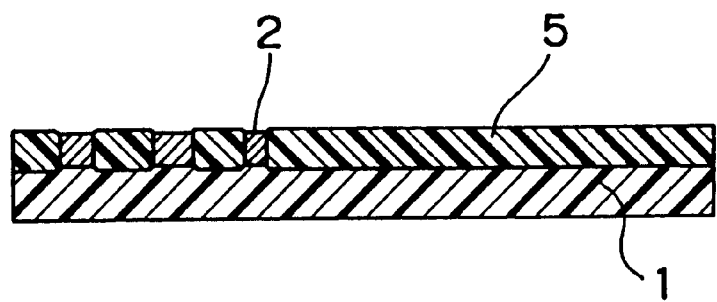
FIG. 5 is a cross sectional view of the thin IC card according to a fourth variation of the first embodiment of the present invention.

Such a construction as shown in FIG. 4 may also be employed where the aperture of the core sheet 7 is made in tapered shape 13 to expand gradually near the top end thereof.

With this construction, when the amount of the sealing adhesive 12 in the aperture 6 is insufficient, for example, the first adhesive 9, which is in melted state under pressure by the press 11 or the like, is made easier to move into the aperture 6 in the step (e), thereby preventing the surface of the adhesive in the aperture from sinking into a concave shape, and making the surface of the second cover sheet 10 flat.

Also flatness of the surface of the first cover sheet 1 can be improved by making the thickness of the first adhesive 5 provided on the first cover sheet 1 after being cured equal to or greater than the thickness of the wiring pattern 2 formed on the first cover sheet 1.

The wiring pattern 2 is usually a pattern of fine lines. In case the wiring pattern 2 is thicker than the first adhesive 5 layer, surface of the first cover sheet 1 becomes convex at the position of the wiring pattern, thus making it impossible to keep the surface flat.

In case thickness of the wiring pattern is equal to or less than the first adhesive 5 layer, on the other hand, the surface of the first cover sheet 1 on the wiring pattern is supported flat by the adhesive in the surrounding thereof because the wiring pattern 2 has a narrow width, thus making it possible to keep the flat surface of the first cover sheet.

Figure 6:
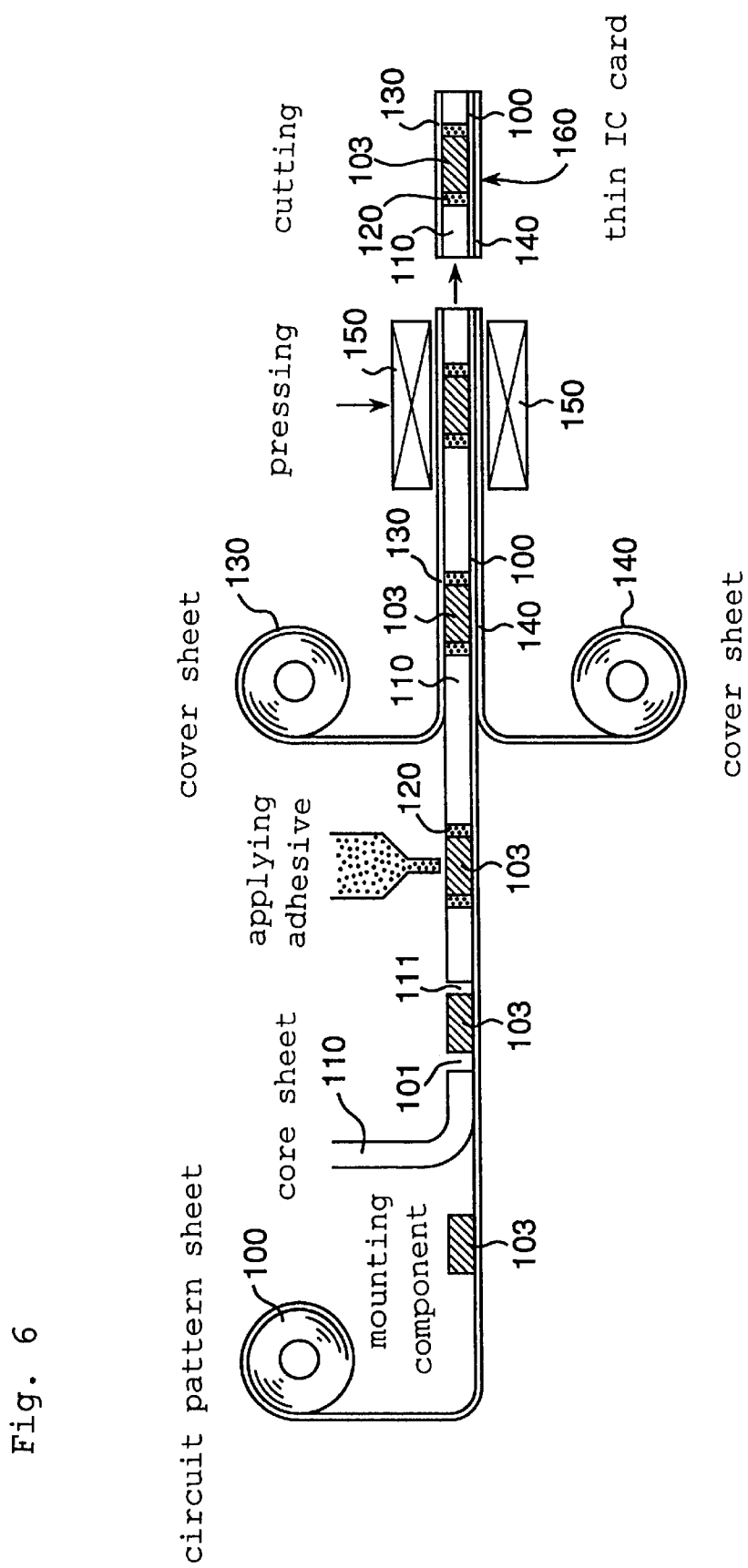
FIG. 6 shows a production step of the thin IC card according to the second embodiment of the present invention.
Figure 7:
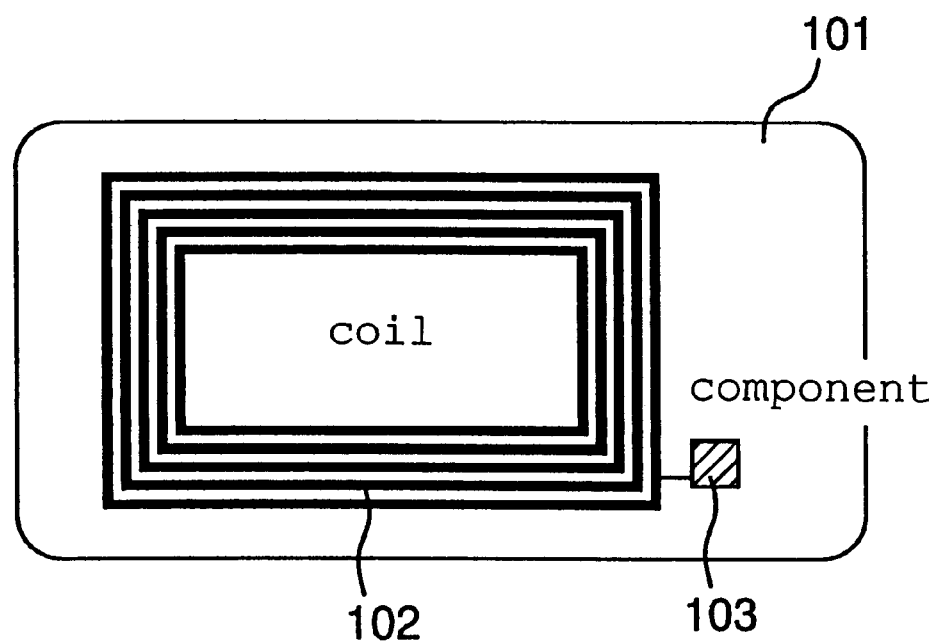
FIG. 7 is a plan view showing the internal construction of the thin IC card produced in the step of FIG. 6.

FIG. 6 schematically shows the production line according to the second embodiment of the present invention, and FIG. 7 is a plan view showing the circuit construction of the thin IC card produced thereby.

Numeral 100 denotes a roll of circuit pattern sheet which is a long polyethylene terephthalate sheet 101 having a thickness of 0.1 mm with spiral coils 102 formed by vapor deposition thereon at proper intervals and an IC 103 connected to each thereof being mounted, and is fed at the line speed. At a position downstream of the position where the circuit pattern sheet is fed out, a core sheet 110 which is a long polyethylene terephthalate sheet having a thickness of 0.5 mm is supplied from a roll of the sheet and is laminated on the circuit pattern sheet 100. The core sheet 110 has apertures 111 made therein at proper intervals for housing the mounted components 102. The core sheet may bear a hot-melt adhesive applied thereto beforehand on both sides.

The assembly of the circuit pattern sheet 100 and the core sheet 110 laminated on each other is moved to an adhesive applying position located a little downstream, where the apertures 111 are filled with the melted hot-melt adhesive 120 thereby to cover the mounted components 102 located therein.

Then, cover sheets 130, 140 are supplied onto the laminate of the circuit pattern sheet 100 and the core sheet 110 from above and below, thereby holding the laminated sheets therebetween. For the cover sheet, a long polyethylene terephthalate sheet having a thickness of 25 $\mu$m with the hot-melt adhesive applied thereto beforehand is used.

Then the cover sheet 130, the core sheet 110, the circuit pattern sheet 100 and the second cover sheet 140 are heated to about 120° C. while applying a pressure of 5 kgf/cm$^2$ by means of a press 150 from above. This causes the hot-melt adhesive layers formed on the bonding surfaces of the cover sheets 130, 140 and the hot-melt adhesive 140 filling the aperture of the core sheet 110 are melted to fuse with each other make the surfaces of the cover sheets 130, 140 flat. Then pressurization and heating are stopped and the laminate is cut into predetermined size, thereby completing the thin IC card 160

While the circuit pattern sheet 100 and the second cover sheet 140 are separate bodies in this embodiment, it goes without saying that the present invention can be applied also to a case where the circuit is formed on the cover sheet 140. In this case, the hot-melt adhesive may also be applied to the bonding surface of the core sheet in advance.

FIELD OF INDUSTRIAL APPLICATION

According to the present invention, as will be clear from the above description, because the cover sheet, the circuit pattern sheet and the core sheet are bonded with each other by means of the hot-melt adhesive and the hot-melt adhesive is used also as the filling adhesive for the apertures, excess or shortage of the filling resin in the apertures can be compensated for and fine adjustment of the amount of the filling material can be done, thereby making it possible to produce the thin IC card having flat surface of the cover sheet without precise control of the amount of the filling material. Also because mass production can be carried out in a continuous production line by using a material having a high melting point such as polyethylene terephthalate, the thin read/write IC card which has no adverse effect on the environment can be provided at a low cost.

What is claimed is:

1. A method for producing a thin IC card that includes a cover sheet, a core sheet having apertures for housing electronic components, and a circuit pattern sheet whereon a wiring pattern is formed and electronic components are mounted, comprising:

laminating the core sheet on the circuit pattern sheet so that the electronic components mounted on the circuit pattern sheet are located at the positions of the apertures;

filling the apertures housing the electronic components with hot-melt sealing adhesive;

providing the cover sheet on the laminate of the circuit pattern sheet and the core sheet, said cover sheet being provided on one side of the circuit pattern sheet;

applying heat and pressure to bond the cover sheet and the core sheet, after said filling the apertures housing the electronic components with hot-melt sealing adhesive, via a hot-melt bonding adhesive layer formed on at least one opposing bonding surface, such that said hot-melt bonding adhesive layer and the previously provided hot-melt sealing adhesive fuse during bonding; and cutting the laminate to a predetermined size.

2. The method as claimed in claim 1, wherein another cover sheet is bonded on the back side of the circuit pattern sheet in the bonding process of the cover sheet.

3. The method as claimed in claim 1, wherein each of the cover sheet, the core sheet, and the circuit pattern sheet is supplied from rolls of long sheets and the steps for producing a thin IC card are repeated so that the thin IC cards are continuously produced.

4. The method as claimed in claim 1, wherein the cover sheet and the core sheet are made of polyethylene terephthalate (PET).

5. The method as claimed in claim 1, wherein the hot-melt sealing adhesive and the hot-melt bonding adhesive layer include a thermosetting resin.

6. The method as claimed in claim 2, wherein the hot-melt bonding adhesive layer is applied to the bonding surfaces of the cover sheets.

7. The method as claimed in claim 2, wherein a circuit protection sheet comprises the circuit pattern sheet having said hot-melt sealing adhesive on the circuit pattern forming surface of the circuit pattern sheet.

8. A thin IC card comprising:

a cover sheet;

a core sheet having apertures for housing electronic components, the core sheet having a front side and back side;

a circuit pattern sheet with a wiring pattern and the electronic components mounted thereon; and another cover sheet, wherein said cover sheet, said core sheet, said circuit pattern sheet, and said another cover sheet are laminated, spaces in the apertures of the core sheet around the electronic components are filled with a hot-melt sealing adhesive that includes thermosetting resin, and the cover sheets are bonded via a hot-melt adhesive bonding layer that includes thermosetting resin formed on bonding surfaces of the front and back sides of the core sheet and that is fused with the hot-melt sealing adhesive.

9. The IC card of claim 8, wherein the cover sheet is made of polyethylene terephthalate and has a hot-melt bonding adhesive layer that includes a thermosetting resin within 50% in volume on the bonding surface thereof.

* * * * *